(12) United States Patent
Gong

(10) Patent No.: US 9,264,209 B2
(45) Date of Patent: Feb. 16, 2016

(54) METHOD AND CONTROL CIRCUITRY FOR PERFORMING FULL-DUPLEX WIRELESS COMMUNICATION

(71) Applicant: Google Inc., Mountain View, CA (US)

(72) Inventor: Xiaohong Gong, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 115 days.

(21) Appl. No.: 14/149,111

(22) Filed: Jan. 7, 2014

(65) Prior Publication Data

US 2015/0195079 A1    Jul. 9, 2015

(51) Int. Cl.
*H04L 5/14*    (2006.01)

(52) U.S. Cl.
CPC ................... *H04L 5/1415* (2013.01)

(58) Field of Classification Search
CPC ............... H04B 7/0452; H04L 1/1614; H04L 2001/0093; H04L 5/1415; H04W 28/02
USPC .......................................... 370/277, 331, 486
See application file for complete search history.

(56) References Cited

U.S. PATENT DOCUMENTS

| | | | |
|---|---|---|---|
| 5,155,726 A | 10/1992 | Spinney et al. | |
| 5,561,666 A | 10/1996 | Christensen et al. | |
| 6,404,753 B1 | 6/2002 | Chien et al. | |
| 7,483,411 B2 | 1/2009 | Weinstein et al. | |
| 8,031,744 B2 | 10/2011 | Radunovic et al. | |
| 2007/0165578 A1 | 7/2007 | Yee et al. | |
| 2008/0212612 A1* | 9/2008 | Singh et al. | 370/474 |
| 2009/0092066 A1 | 4/2009 | Chindapol et al. | |
| 2010/0008342 A1 | 1/2010 | Nishida et al. | |
| 2015/0016309 A1* | 1/2015 | Fang et al. | 370/277 |
| 2015/0078215 A1* | 3/2015 | Zhou et al. | 370/277 |

FOREIGN PATENT DOCUMENTS

WO    WO-2004045082 A2    5/2004
WO    WO-2013179270 A1    12/2013

OTHER PUBLICATIONS

International Search Report and Written Opinion for PCT Application No. PCT/US2014/072161 dated Mar. 30, 2015.

* cited by examiner

*Primary Examiner* — Christopher Grey
(74) *Attorney, Agent, or Firm* — Honigman Miller Schwartz and Cohn LLP

(57) ABSTRACT

A method includes receiving, by control circuitry, a received portion of a first data unit from a remote device and determining, by the control circuitry, a first duration of the first data unit based on the received portion. The method further includes generating, by the control circuitry, a second data unit with data to be transmitted and transmitting, by the control circuitry, the second data unit to the remote device while receiving the unreceived portion of the first data unit. The second data unit has a second duration equal to the remaining duration of an unreceived portion of the first data unit.

18 Claims, 11 Drawing Sheets

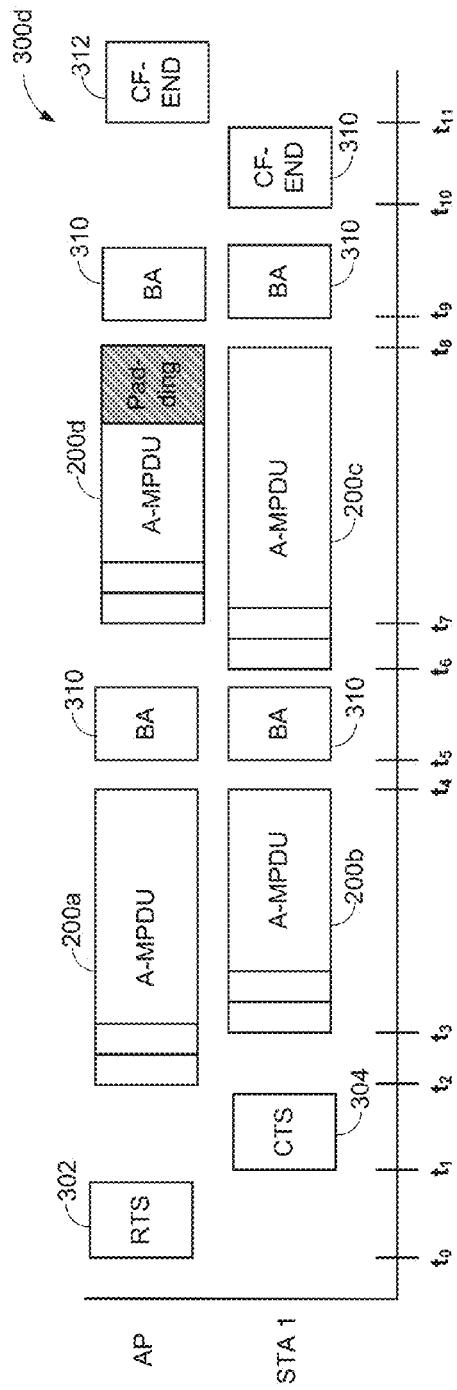
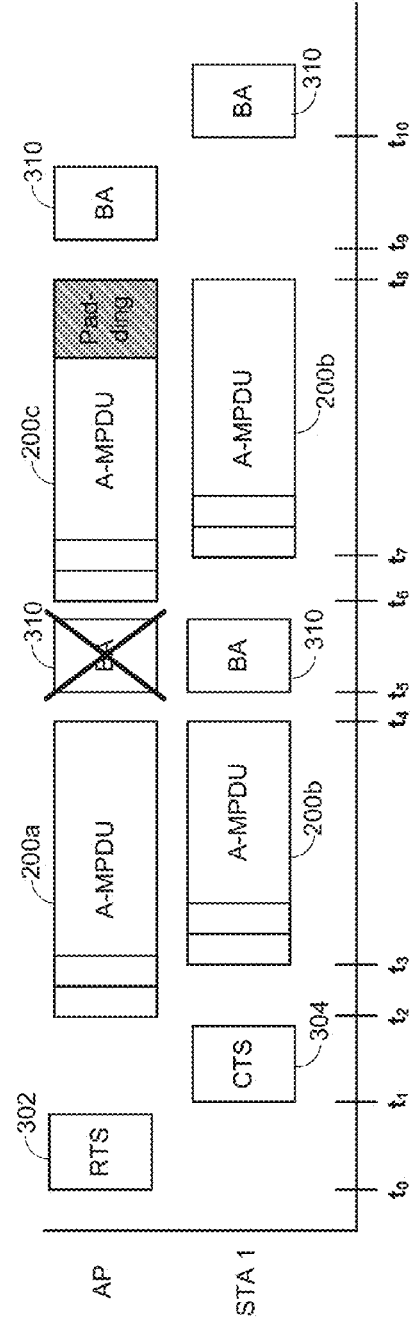
FIG. 3D
FIG. 3E

METHOD AND CONTROL CIRCUITRY FOR PERFORMING FULL-DUPLEX WIRELESS COMMUNICATION

TECHNICAL FIELD

This disclosure relates to methods and control circuitry for performing full-duplex wireless communication.

BACKGROUND

The existing 802.11 media access control (MAC) architecture supports half-duplex communication. In half-duplex communication, a device (e.g., a wireless access point ("AP") or an enrollee station ("STA")) can only transmit or receive during an interval. In full duplex communication (also referred to as "double-duplex" communication), an AP and a STA can communicate in both directions at the same time. Put another way, the AP and the STA both transmit and receive data units at the same time.

SUMMARY

The existing 802.11 machine access control (MAC) layer does not support full-duplex operations, which is a long felt need. This disclosure relates to a communication protocol that allows current 802.11 stations to have full-duplex capabilities, despite legacy limitations. Once a transmit opportunity (TXOP) has been established, a responder (TXOP responder) reads a header (e.g., a PHY header) of a received transmission to determine its sender and a duration. The TXOP responder can then send a canceling transmission that ends at the same time, thus providing full-duplex capabilities. To provide backward compatibility, the responder and sender send each other acknowledgements (e.g., block acknowledgements (BA)), in parallel or series. An access point (AP) can communicate with one or more legacy stations in one transmit opportunity using the full-duplex procedure.

One aspect of the disclosure provides a method that includes receiving, by control circuitry, a received portion of a first data unit from a remote device and determining, by the control circuitry, a first duration of the first data unit based on the received portion. The method further includes generating, by the control circuitry, a second data unit with data to be transmitted and transmitting, by the control circuitry, the second data unit to the remote device while receiving the unreceived portion of the first data unit. The second data unit has a second duration equal to the remaining duration of an unreceived portion of the first data unit.

Implementations of the disclosure may include one or more of the following features. In some implementations, transmitting the second data unit is completed at the same time that the remote device completes transmission of the first data unit.

The first data unit may be a first PHY protocol data unit (PPDU) that includes a first header and a first aggregated MAC protocol data (A-MPDU) unit. The second data unit may be a second PPDU that includes a second header and a second A-MPDU. Additionally or alternatively, determining the first duration may include decoding, by the control circuitry, at least a portion of the first header. The first header indicates the first duration.

In some examples, the method includes decoding, by the control circuitry, a portion of the first aggregated medium access control protocol data unit to determine whether to transmit sequential block acknowledgments and decoding, by the control circuitry, the rest of the first PPDU. When the first PPDU is successfully decoded and the first header instructs the control circuitry to transmit sequential block acknowledgments, the method includes receiving, by the control circuitry, a first block acknowledgment or a block ack request from the remote device and transmitting, by the control circuitry, a block acknowledgment to the remote device in response to receiving the first block acknowledgment or the block ack request. When the first PPDU is successfully decoded and the first header instructs the control circuitry to transmit simultaneous block acknowledgments, the method further includes, transmitting, by the control circuitry, the second block acknowledgment to the remote device without waiting to receive the first block acknowledgment.

In some implementations, the method includes generating the second data unit by determining, by the control circuitry, the remaining duration based on the first duration and a received duration indicative of an amount of data received in the received portion. The method may further include determining, by the control circuitry, the second duration based on the remaining duration. When an amount of the data to be transmitted is insufficient to satisfy the second duration, the method includes generating, by the control circuitry, the second data unit using the data to be transmitted and adding, by the control circuitry, a padding to the second data unit. The amount of padding added to the second data unit and the amount of data to be transmitted are collectively sufficient to satisfy the second duration requirement. When an amount of the data to be transmitted is sufficient to satisfy the second duration, the method includes generating, by the control circuitry, the second data unit using the data to be transmitted.

In some examples, the method includes receiving, by the control circuitry, a request to send from the remote device and transmitting, by the control circuitry, a clear to send to the remote device in response to the request to send. Additionally or alternatively, transmitting the clear to send establishes a transmit opportunity. Transmitting the clear to send may set respective network availability vectors of other devices in a basic service set of a device of the control circuitry. The control circuitry may be a component of an enrollee station, and the remote device may be an access point.

Another aspect of the disclosure provides an apparatus including a transceiver and control circuitry in communication with each other. The control circuitry is configured to receive a received portion of a first data unit from a remote device, determine a first duration of the first data unit based on the received portion, and generate a second data unit with data to be transmitted. The second data unit has a second duration equal to a remaining duration or an unreceived portion of the first data unit. The control circuitry is further configured to transmit the second data unit to the remote device while receiving the unreceived portion of the first data unit. The control circuit may complete transmitting the second data unit at the same time that the remote device completes transmission of the first data unit.

In some examples, the first data unit is a first PPDU that includes a first header and a first aggregated A-MPDU unit. The second data unit is a second PPDU that includes a second header and a second A-MPDU. Additionally or alternatively, the control circuitry may be configured to determine the first duration by decoding at least a portion of the first header. The first header indicates the first duration.

In some implementations, the control circuitry is further configured to decode a portion of the first aggregated medium access control protocol data unit to determine whether to transmit sequential block acknowledgments and to decode the rest of the first PPDU. When the first PPDU is successfully decoded and the first header instructs the control circuitry to transmit sequential block acknowledgments, the apparatus is configured to receive a first block acknowledgment or a block ack request from the remote device and transmit a block acknowledgment to the remote device in response to receiving the first block acknowledgment or the block ack request. When the first PPDU is successfully decoded and the first header instructs the control circuitry to transmit simultaneous block acknowledgments, the apparatus is further configured to transmit by the second block acknowledgment to the remote device without waiting to receive the first block acknowledgment.

In some implementations, the control circuitry generates the second data unit by determining the remaining duration based on the first duration and a received duration indicative of an amount of data received in the received portion and determining the second duration based on the remaining duration. When an amount of the data to be transmitted is insufficient to satisfy the second duration, the control circuitry generates the second data unit using the data to be transmitted and adds a padding to the second data unit. The amount of padding added to the second data unit and the amount of data to be transmitted are collectively sufficient to satisfy the second duration requirement. When an amount of the data to be transmitted is sufficient to satisfy the second duration, the control circuitry generates the second data unit using the data to be transmitted.

The control circuitry is further configured to receive a request to send the remote device and transmit clear to send to the remote device in response to the request to send. Additionally or alternatively, transmitting the clear to send may establish a transmit opportunity and the apparatus may be the transmit opportunity responder. Transmitting the clear to send may set respective network availability vectors of other devices in a basic set of a device of the control circuitry. The remote device may be an access point.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3A-3G are diagrams of example methods for performing full-duplex communication.

Like reference symbols in the various drawings indicate like elements.

DETAILED DESCRIPTION

Figure 1:
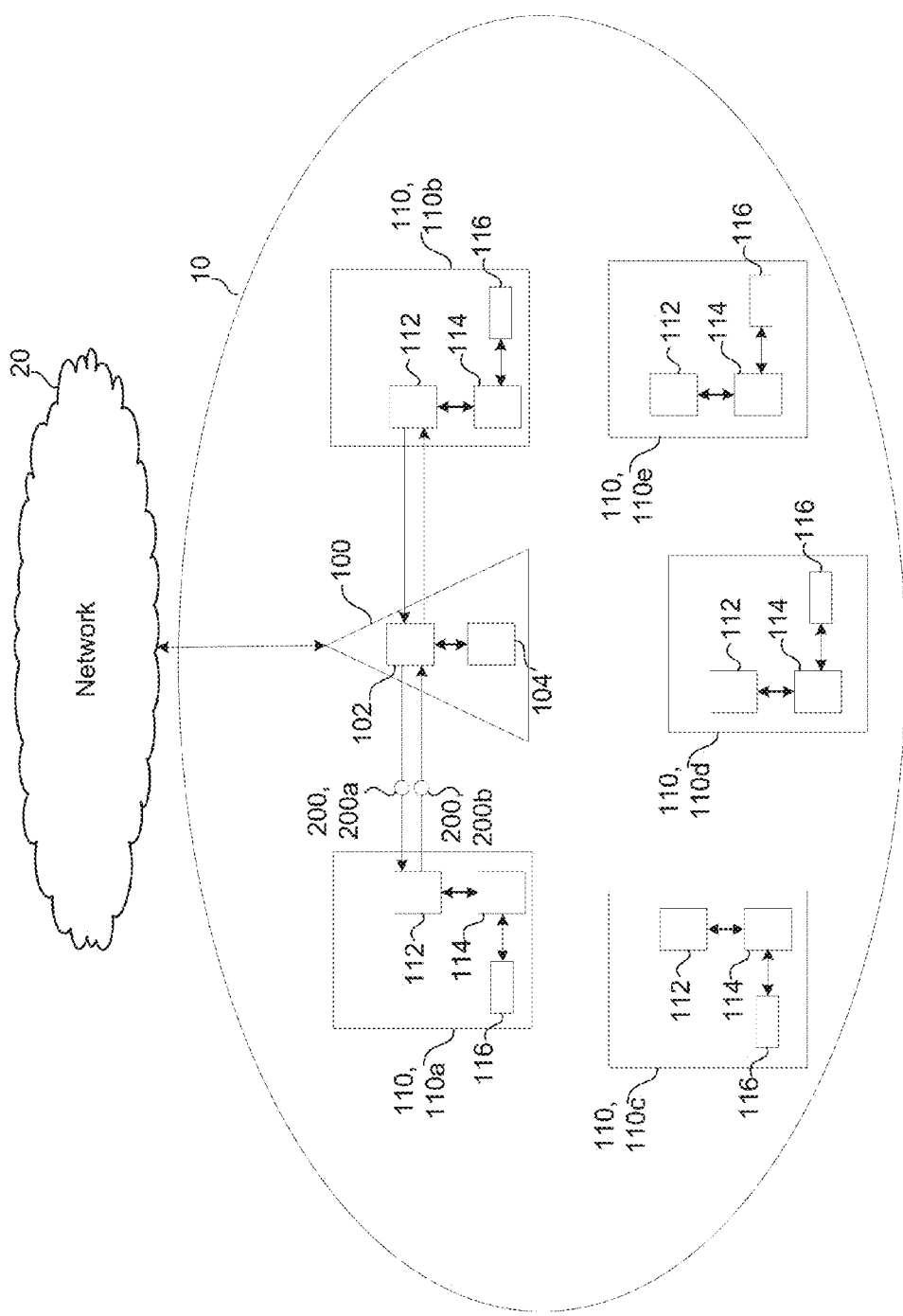
FIG. 1 is a schematic view of an example a basic service set including an access point and one or more enrollee stations configured to perform full-duplex communication.

Glossary of Abbreviations
AP—Access Point
A-MPDU—Aggregated MAC Protocol Data Unit
BSS—Basic Service Set
BA—Block Acknowledgment
BAR—Block Acknowledgment Request
CTS—Clear To Send
NAV—Network Allocation Vector
PPDU—PHY Protocol Data Unit
RTS—Request To Send
STA—Enrollee Station
TXOP—Transmit Opportunity FIG. 1 illustrates an example basic service set (BSS) 10 that includes an access point (AP) 100 in communication with a set of enrollee stations (STA) 110. The AP 100 allows a STA 110 to communicate with other devices within the BSS 10 or remote devices outside the BSS 10 via a network 20. In the tatter scenario, the AP 100 transmits data to and receives data from the remote devices via the network 20. The AP 100 routes data received from the network 20 to one or more STAs 110 and routes data received from one or more STAs 110 to the network 20. The network 20 may include any type of network that allows sending and receiving of communication signals, such as a wireless telecommunication network, a cellular telephone network, a time division multiple access (TDMA) network, a code division multiple access (CDMA) network, a global system for mobile communications (GSM), a third generation (3G) network, fourth generation (4G) network, a satellite communications network, and any combination thereof.

In some implementations, the AP 100 and the STAs 110 perform communication according to the IEEE 802.11 protocol. The AP 100 and at least one of the STAs 110 are configured to perform full-duplex communication. In some scenarios, one or more of the STAs 110 are not configured to perform full-duplex communication and are configured to only perform half-duplex communication. These STAs 110 may be referred to as legacy STAs 110. When performing full-duplex communication, both the AP 100 and the STA 110 transmit and receive data units 200 at the same time. Initially, a first device (one of the AP 100 and the STA 110) initiates a transmit opportunity (TXOP) and begins transmitting a first data unit 200 to the second device (the other device of the AP 100 and the STA 110). A TXOP can refer to a bounded time interval during which the first device e.g., the AP 100) and one or more other devices (e.g., the STAs 110) transmit as many data units 200 as possible. The first device can be referred to as a TXOP holder and the second device can be referred to as a TXOP responder. The second device decodes a portion of the first data unit 200a to determine the length of the data unit 200. The second device then generates a second data unit 200b, while receiving the rest of the first data unit 200a, such that the second data unit 200b has a duration equal to the remaining duration of the first data unit 200a. Put another way, the second device generates and transmits the second data unit 200b such that the first device finishes transmitting the first data unit 200a at the same time the second device finishes transmitting the second data unit 200b.

Figure 2:
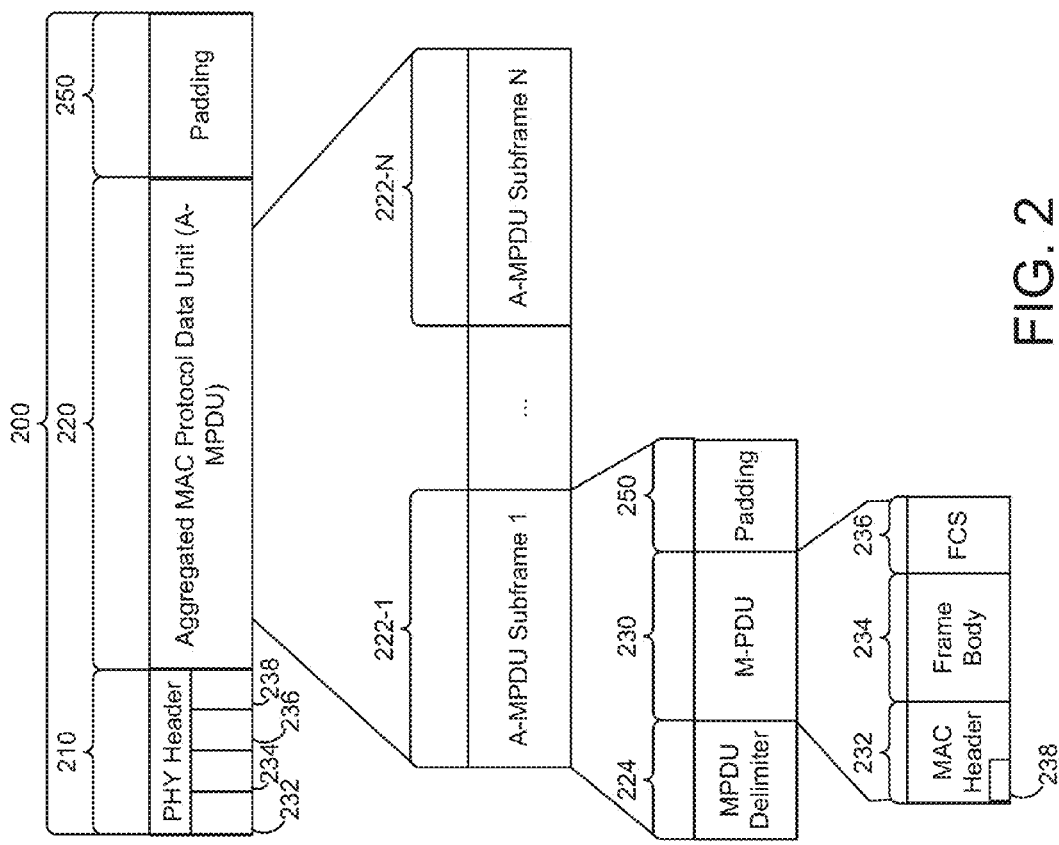
FIG. 2 is a schematic view of an example data unit.

In some implementations, the data units 200 are PHY protocol data units (PPDU) 200. FIG. 2 illustrates an example data unit 200. In the illustrated example, the data unit 200 is a PPDU 200. The PPDU 200 can include a PHY header 210 and an aggregated MAC protocol data unit (A-MPDU) 240 that includes the payload of the PPDU 200. In some scenarios, a padding 250 may be appended to the end of the PPDU 250 as well. The padding 250 can be a variable amount of bits, bytes, or symbols to ensure that the PPDU 250 is of a sufficient size.

The PHY header 210 can contain a plurality of fields, including a destination address field 212, a source address field 214, and a duration field 216. The source address field 212 indicates a MAC address of the device from which the PPDU 200 is being sent (e.g., the MAC address of the AP 100 or a STA 110). The duration field 216 indicates the remaining duration in the TXOP after transmitting the A-MPDU 220. The duration field 216 is used by all receiving devices to set the NAV in their MAC (which is discussed further below).

The A-MPDU 220 can include up to N A-MPDU subframes 222-1 . . . 222-N. Each A-MPDU subframe 222 can include an MPDU delimiter 224, a MPDU 230, and possibly padding 250. Each MPDU 230 can include a MAC header 232, a frame body 234 that contains the payload of the MPDU 230, and a frame check sequence (FCS) 236. The MAC header 232 can include, inter alia, a sequential BA field 238. The sequential BA field 238 is a flag that indicates whether BAs 310 are to be sent simultaneously or sequentially. A receiving device provides a BA 310 to a transmitting device to signify that the receiving device successfully received and decoded the entire PPDU 200. For purposes of explanation, when the sequential BA field 238 is set to 1, the device providing the PPDU 200 is instructing the receiving device to wait for a BA 310 from the device before responding with a BA 310. When the sequential BA field 238 is not set (i.e., set to 0), the device providing the PPDU 200 is instructing the receiving device to send a BA 310 after receiving the PPDU 200. As will be described in further detail below, the BA sequential field 238 can be set to 1 when the setting device decides to end the TXOP.

The PPDU 200 can include additional components not explicitly shown in FIG. 2. For example, the header 210 may include a PHY preamble, an Ethernet header, and an IP header. The PPDU 200 may also include a MAC footer and/or a cyclic redundancy check code.

Referring back to FIG. 1, the AP 100 includes a transceiver 102 and control circuitry 104 that manages communications using the transceiver 102. The transceiver 102 can be any suitable device capable of wirelessly receiving data and wirelessly transmitting data. In some implementations, the transceiver 102 includes at least one receiver that receives data wirelessly and at least one transmitter that transmits data wirelessly.

The control circuitry 104 can be, for example, a processor executing computer-readable instructions, a field programmable gate array (FGPA), a digital signal processor (DSP), or any other suitable circuitry. The control circuitry 104 can receive data to be transmitted (e.g., from the network or from a STA 110) and can generate data units 200 containing some or all of the data to be transmitted. In some implementations, the control circuitry 104 generates the PPDUs 200 according to the IEEE 802.11 protocol. In these implementations, generating a PPDU 200 may include rewrapping received PPDU 200 with a new PHY header 210. The new PHY header 210 can indicate a duration of the PPDU 200. Further, the MAC headers 232 of the PPDU 220 can indicate whether the receiving device is to send simultaneous or sequential BAs 310. When the AP 100 is the TXOP holder, the control circuitry 104 begins transmitting the PPDU 200 to a TXOP responder (e.g., a STA 110). While the control circuitry 104 is transmitting the PPDU 200 to the TXOP responder, the TXOP responder can transmit another PPDU 200, such that the control circuitry 104 transmits the PPDU 200 to the TXOP responder while receiving the other PPDU 200 from the TXOP responder.

In some implementations, the control circuitry 104 initiates a TXOP by transmitting a request to send packet (RTS) 302 to a STA 110. The STA 110 can respond by sending a clear to send packet (CTS) 304 to the AP 100. The control circuitry 104 receives the CTS 304, thereby establishing the TXOP with the STA 110.

The STA 110 can be any type of device that is configured to perform wireless communication. Examples of STAs 110 can include, but are not limited to, laptop computers, personal computers, smartphones, tablet computers, wearable computer devices, gaming consoles, televisions, and smart appliances. A STA 110 includes a transceiver 112 and control circuitry 114. The transceiver 112 can be any suitable device capable of wirelessly receiving data and wirelessly transmitting data In some implementations, the transceiver 112 includes at least one receiver that receives data wirelessly and at least one transmitter that transmits data wirelessly.

The control circuitry 114 can be, for example, a processor executing computer-readable instructions, a field programmable gate array (FGPA), a digital signal processor (DSP), or any other suitable circuitry. The control circuitry 114 can receive data units 200 from and transmit data units 200 to the AP 100. The control circuitry 114 and the transceiver 112 are configured to perform full-duplex communication.

In some scenarios, the control circuitry 114 receives a RTS 302 (FIG. 3) from the AP 100. In response, the control circuitry 114 can transmit a CTS 304 (FIG. 3) to the AP 100 to establish a TXOP. In this scenario, the STA 110 is the TXOP responder. As the TXOP responder, the control circuitry 114 waits for a first PPDU 200a from the AP 100. Once the control circuitry 114 begins receiving the first PPDU 200a from the AP 100, the control circuitry 114 can begin decoding the first PPDU 200a. As the control circuitry 114 decodes the first PPDU 200a, the control circuitry 114 determines the duration of the first PPDU 200a and whether to transmit the BA sequentially or simultaneously.

Once the control circuitry 114 determines the duration of the first PPDU 200a, the control circuitry 114 can determine a duration of a second PPDU 200b. The control circuitry 114 determines the duration of the second PPDU 200b such that transmission of the second PPDU 200b is complete at the same time as transmission of the first PPDU 200a. The control circuitry 114 then generates the second PPDU 200b. The control circuitry 114 may obtain the data to generate the second PPDU 200b from any suitable source, such as a transmission buffer. The control circuitry 114 inserts the data into the A-MPDU 220. In certain situations, the amount of data to be transmitted is less than required to generate the second PPDU 200b. In these situations, the control circuitry 114 may add padding 250 to the A-MPDU 220 so that the duration of the second PPDU 200b is equal to the remaining duration of the first PPDU 200a. As the control circuitry 114 generates the second PPDU 200b it can begin transmitting the second PPDU 200b to the AP 100. As the control circuitry 114 transmits the second PPDU 200b, the control circuitry 114 continues to receive and decode the first PPDU 200a. After the control circuitry 114 has received and successfully decoded the second PPDU 200b, the control circuitry 114 can transmit a BA 310 to the AP 100. If the BA field 238 in the MAC header 232 is set to 1, the control circuitry 114 waits to receive the BA 310 from the AP 100 before transmitting the BA 310. If the BA field 238 in the MAC header 232 is set to 0, the control circuitry 310 transmits the BA 114 after waiting a predetermined amount of time.

The control circuitry 114 of the STA 110 can further maintain a network allocation vector (NAY) 116. A NAV 116 is a virtual carrier sensing mechanism used within wireless network protocols such as IEEE 802.11 which limits the need for physical carrier sensing at the air interface. When the control circuitry 114 senses that the AP 100 has initiated a TXOP with one or more other devices, the control circuitry 114 can set the NAV 116 such that the control circuitry does not attempt to send or receive until the NAV 116 is reset. The control circuitry 114 resets the NAV 116 when the TXOP of the other devices is complete.

The foregoing description of the control circuitry 104 of the AP 100 and the control circuitry 114 of the STA 110 are provided for example only. Furthermore, when the STA 110 is acting as the TXOP holder, the control circuitry 114 of the STA 110 may perform the function of the control circuitry 104 of the AP 100. Similarly, when the AP 100 is acting as the TXOP responder, the control circuitry 104 of the AP 100 may perform the functionality of the control circuitry 114 of the STA 110.

FIGS. 3A-3G illustrate example communication methods for performing full duplex communication. The methods may be performed by the control circuitry 104 of the AP 100 and the control circuitry 114 of one or more STAs 110.

Figure 3A:
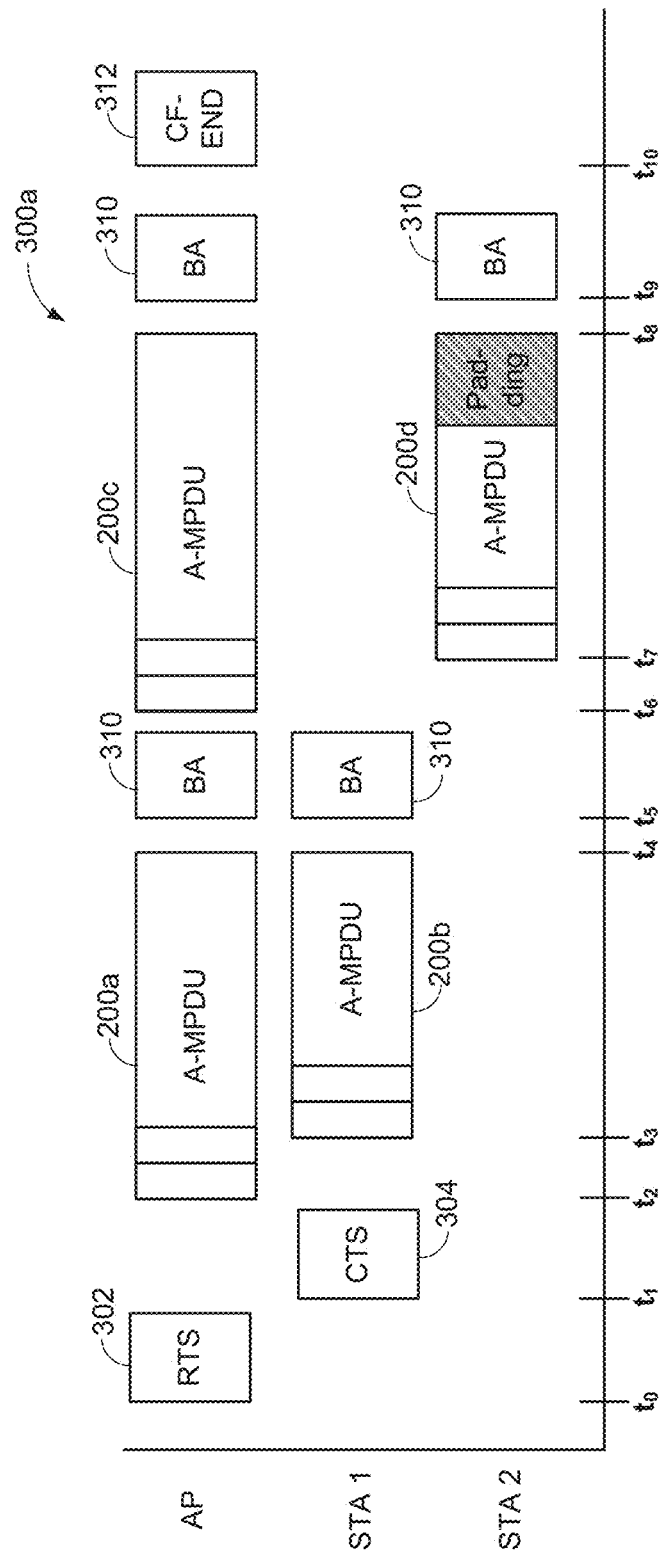

FIG. 3A illustrates an example communication method 300a for performing full duplex-communication involving an AP 100, a first STA 110a, and a second STA 110a. In some implementations, the AP 100 initiates a TXOP by transmitting a RTS 302 to the first STA 110a, as shown at $t_0$. The first STA 110a can respond to the RTS 302 by transmitting a CTS 304), as shown at $t_1$. In this way, the AP 100 and the first STA 110a have established a TXOP. In the example of FIG. 3A, the AP 100 is the TXOP holder and the first and second STAs 110a, 110b are the TXOP responders. In some scenarios, however, a STA 110 can act as the TXOP holder and the AP 100 acts as the TXOP responder. In some implementations, the AP 100 and the first STA 110a can establish a TXOP without exchanging a RTS 302 and a CTS 304. While the exchange of the RTS 302 and the CTS 304 is optional, the exchange thereof sets the NAVs 116 of surrounding STAs 110, including legacy STAs 110 (those unable to perform full-duplex communication), so that the surrounding STAs 110 refrain from transmitting while their respective NAVs 116 are set.

Upon establishment of the TXOP, the AP 100 can transmit a first PPDU 200a to the first STA 110a, as shown at $t_2$. Upon transmission of the first PPDU 200a, the first STA 110a begins receiving the PPDU 200a. While receiving the first PPDU 200a, the first STA 110a decodes the PHY header 210 and at least a portion of A-MPDU 220. By decoding the PRY header 210, the first STA 110a determines the duration of the first PPDU 200a. By decoding the A-MPDU 220, the first STA 110a can determine whether the BA 310, after successful receipt of the first PPDU 200a, is to be sent sequentially or simultaneously.

At $t_3$, the first STA 110a generates and transmits a second PPDU 200b having a duration that is equal to the remaining duration of the first PPDU 200a. The first STA 110a can determine the remaining duration of the first PPDU 200a based on the amount of the first PPDU 200a already received and the duration of the entire first PPDU 200a. The first STA 110a decodes the PHY header 210 of the first PPDU 220a to obtain the first duration of the entire first PPDU 200a. The first STA 110a further knows the amount of PHY symbols it has decoded from the first PPDU 200a. Based on the first duration, the number of decoded symbols, and the PHY delay of the first STA 110a, the first STA 110a determines a duration for the second PPDU 200b. A PHY delay of a device (e.g., an STA 110 or an AP 100) can refer to the amount of delay from when a symbol is received and a symbol is decoded by the device. In some implementations, the first STA 110a (or any device) can compute the second delay according to:

$$\text{Second Duration} = \text{First Duration} - \left( \frac{\text{Symbols}}{\text{Baud Rate}} + \text{PHY Delay} \right) \quad (1)$$

where Symbols is the number of decoded symbols, Baud Rate is the baud rate of the transmission medium between the first STA 110a and the AP 100, and PHY Delay is the PHY delay of first STA 110a. The control circuitry 114 of the first STA 110a can be configured to determine the baud rate of the transmission medium, In some implementations, the first STA 110a is further configured to determine a size of the second PPDU 200b based on the second duration and the baud rate. In these implementations, the first STA 110a can determine the size (i.e., the number of symbols in the second PPDU 200b) of the second PPDU 200b according to the following equation.

$$\text{Number of Symbols} = \frac{\text{Baud Rate}}{\text{Second Duration}} \quad (2)$$

The first STA 110a can include the duration of the second PPDU 200b in the duration field 216 of the PHY header 210 of the second PPDU 200b as it generates the second PPDU 200b. The first STA 110a generates the second PPDU 200b according to the determined duration and/or the determined size. If the first STA 110a does not have enough data to generate the second PPDU 200b, the first STA 110a can add padding 250 to the second PPDU 200b (not shown in PPDU 200b).

At $t_4$, the AP 100 and the first STA 110a respectively transmit the last symbol of first PPDU 200a and the second PPDU 200b. By ensuring that the last symbol of the first PPDU 200a and the second PPDU 200b are transmitted at the same time, interference between the transmissions is greatly reduced or eliminated. At $t_5$, the AP 100 transmits a BA 310 to the first STA 110a and the first STA 110a transmits a BA 310 to the AP 100. The BAs 310 acknowledge successful receipt and decoding of the respective first and second PPDUs 200a, 200b.

In some examples, the AP 100 may receive data that is to be transmitted to a second STA 110b. At t6, the AP 100 begins generating and transmitting a third PPDU 200c. The AP 100 includes the duration of the third PPDU 200c and sets the sequential BA field 238 of the MAC header(s) 232 of the third PPDU 200c to 0 (i.e., an instruction to transmit the BA 310 simultaneously). Once the AP 100 begins transmitting the third PPDU 200c, the second STA 110b can begin receiving and decoding the third PPDU 200c. While, in this example, the AP 100 transmits the third PPDU 200c the third PPDU 200c may alternatively be sent to the first STA 110a.

At $t_7$, the second STA 110b generates and transmits a fourth PPDU 200d. The second STA 110b ) generates the fourth PPM 200d such that the fourth PPDU 200d has a duration that is equal to the remaining duration of the third PPDU 200c. In some cases, the second STA 110b may not have access to enough data to populate the A-MPDU 240 of the fourth PPDU 200d. In such a case, the second STA 110b includes padding 250 in the fourth PPDU 200d. Padding 250 can refer to one or more bits, bytes, or symbols that are included in a PPDU 200 by a TXOP responder (e.g., the second STA 110b) to ensure that the duration of the PPDU 200 is equal to a duration of the counterpart PPDU 200 sent from a TXOP holder (e.g., the AP 100). In some implementations, the padding 250 is added to the end of the A-MPDU 240. The padding 250 can have any suitable value (i.e., any suitable bit pattern). The padding 250 can be MAC padding (i.e., at the end of each MPDU 230), PHY padding (at the end of the PPDU 200), or a combination of both. In the illustrated example, the second STA 110b determines the amount of padding 250 to include in the A-MPDU 240 based on the duration of the fourth PPDU 200c and the amount of data that the second STA 110b is to transmit to the AP 100. Put another way, the second STA 110b determines: i) the duration of the remaining portion of the third PPDU 200c; ii) a required duration of the A-MPDU 240 of the fourth PPDU 200d so that the AP 100 and the second STA 110b respectively transmit the ends of the third and fourth PPDUs 200c, 200d at the same time; iii) an amount of data that is to be transmitted to the AP 100 from the second STA 110b; and iv) an amount of padding 250 based on the difference of ii) and iii). If, however, the amount of data that the second STA 110b is to transmit to the AP 100 is greater than or equal to the amount of data needed to satisfy the required duration, the second STA 110b does not pad the fourth PPDU 200d.

At $t_8$, the AP 100 and the second STA 110b respectively transmit the last symbol of the third PPDU 200c and the fourth PPDU 200d. At $t_9$, the AP 100 transmits a BA 310 to the second STA 110b and the second STA 110b transmits a BA 310 to the AP 100. At $t_{10}$, the AP 100 can transmit a contention free end (CF-END) 312, thereby resetting the NAV 116 of neighboring STAs 110 and truncating the TXOP.

Figure 3B:
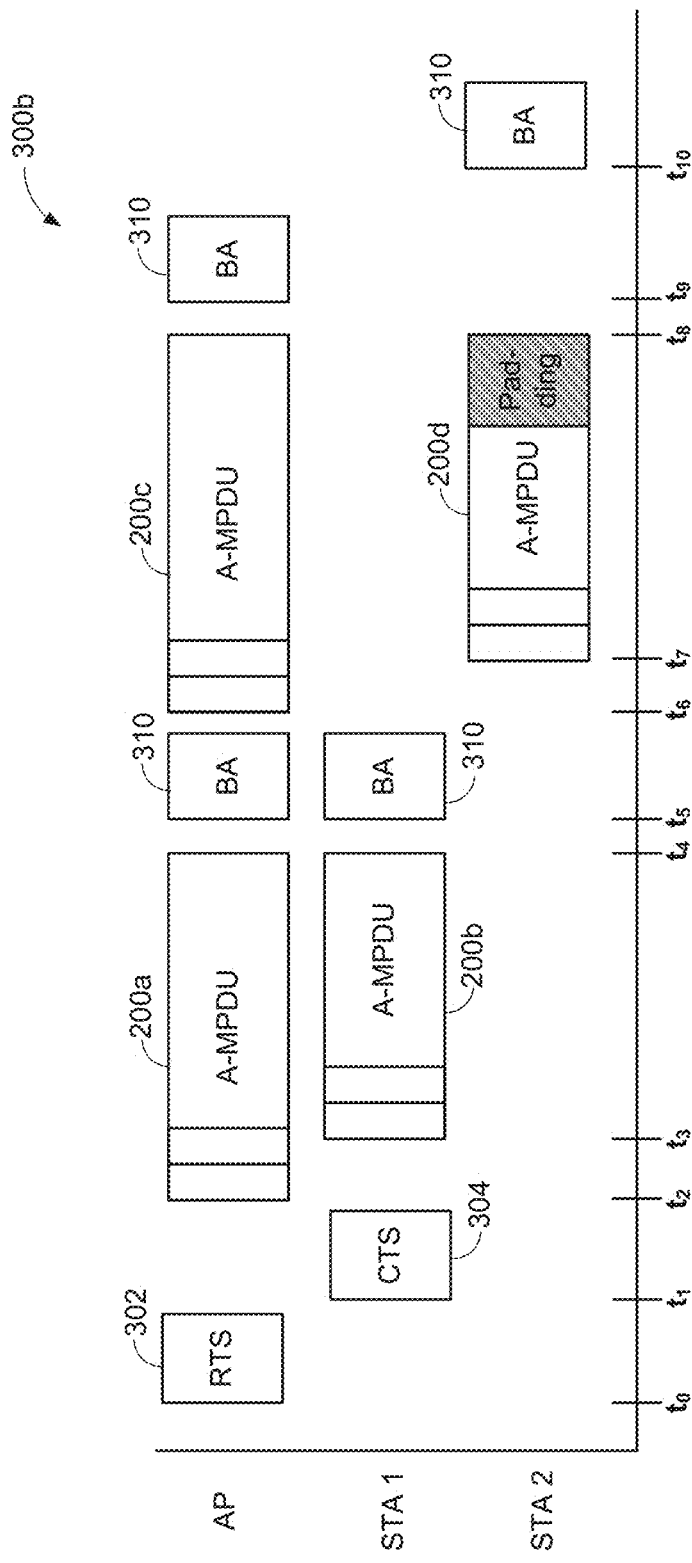

FIG. 3B illustrates another example of a full-duplex communication method 300b including an AP 100, a first STA 110a, and a second STA 110b. In the example of FIG. 3B, the AP 100 is the TXOP holder and the first and second STAs 110a, 110b are the TXOP responders. In some scenarios, the AP 100 does not transmit a CF-END 312 to truncate the TXOP. In these scenarios, the other STAs 110 not involved in the exchange of PPDUs 200 are unable to decode the full-duplex transmission and, therefore, wait for an error interframe space (EIFS) interval before contending for the transmission medium. An EIFS, however, is longer than a DCF inter-frame space (DIFS). Thus, EIFSs can create a bias against STAs 110 not involved in the full-duplex exchange.

Thus, in some implementations the communication method 300b is implemented to support sequential BA 310 exchanges. In such implementations, the AP 100 and the first STA 110a exchange the first and second PPDUs 200a, 200b as described with respect to FIG. 3A. In this exchange, the AP 100 and the first STA 110a set the respective sequential BA fields 238 of the MAC headers 230 such that simultaneous BAs 310 are sent. Thus, when the AP 100 and the first STA 110a complete transmission of the first and second PPDUs 200a, 200b, the AP 100 and the first STA 110a simultaneously exchange BAs 310, as shown at $t_5$.

At $t_6$, the AP 100 transmits a third PPDU 200c to the second STA 110b. The AP 100 sets the sequential BA field 238 of the MAC header 232 to 1, thereby instructing the second STA 110b to send a BA 310 only after receiving a BA 310 from the AP 100. Once the AP 100 successfully receives the fourth PPDU 200d from the second STA 110b, the AP 110 transmits a BA 310, as shown at $t_8$ and $t_9$. At $t_{10}$, the second STA 110b transmits a BA 310, but only after receiving the BA 310 from the AP 100. In this way, other STAs 110 that are not configured to perform full-duplex communication can determine that the TXOP is complete and reset their respective NAVs 116 based on the sequential exchange of BAs 310.

Figure 3C:
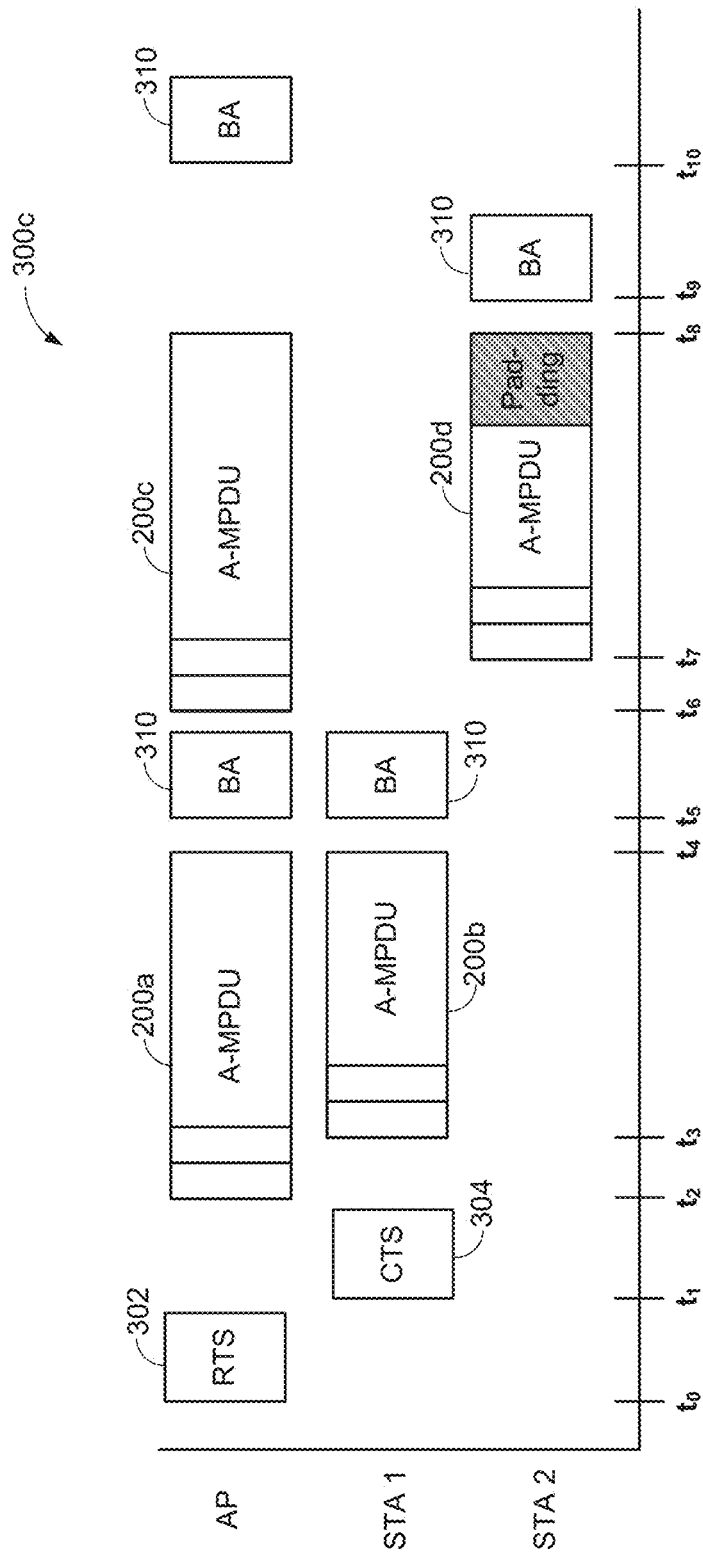

FIG. 3C illustrates another example of a full-duplex communication method 300c. The full-duplex communication method 300c of FIG. 3C is substantially similar to the full-duplex communication method 300b of FIG. 3B, except in the method 300c of FIG. 3C, the second STA 110b sets the sequential BA field 238 of the MAC header 232 of the fourth PPDU 200d to 1, thereby instructing the AP 100 to transmit a BA 310 only after receiving a BA 310 from the second STA 110b. Thus, after the second STA 110b successfully receives the third PPDU 200c (at $t_8$), the second STA 110b transmits a BA 110 to the AP 100, as shown at $t_9$. At $t_{10}$, the AP 100 transmits its BA 110 in response to receiving the BA 310 from the second STA 110b. In the example of FIG. 3C, the AP 100 is the TXOP holder and the first and second STAs 110a, 110b are the TXOP responders.

The communication methods 300b, 300c of FIGS. 3B and 3C are provided for example only and not intended to limit the scope of the disclosure. For example, in sonic implementations the device requesting sequential BA transmission (e.g., AP 100 in FIG. 3B and the second STA 110b in FIG. 3C) can transmit a Block Ack Request (BAR) in addition to or instead of the BA 310. In the former scenario, the BAR can be appended right after the transmitting device sends the BA 310.

FIG. 3D illustrates another example of a full-duplex communication method 300d including an AP 100 and a STA 110. In the method 300d of FIG. 3D, the AP 100 may initiate a TXOP reverse direction grant (RDG). When a certain STA 110 obtains a TXOP through contention, the STA 110 is called a TXOP holder. When the TXOP holder does not transmit data itself, the TXOP holder temporarily transfers TXOP control to another STA 110, and the another STA 110 that is enabled to send data to the TXOP holder is called RDG. In the RDG, the TXOP holder is called a reverse direction initiator (RI) Initiator), and the STA 110 that temporarily obtains the TXOP control granted by the RD Initiator is called a reverse direction responder (RD Responder). When an RD Responder sends a last frame to an RD Initiator, or requires an RD Initiator to send a BA 310 for the frame, the RD Responder automatically returns TXOP control back to the RD Initiator.

In some implementations, the AP 100 can initiate the RDG by setting an RDG subfield in one or more of the MPDUs 230 of the first PPDU 200a to 1 prior to transmitting the first PPDU 200a to the STA 110. Initially, the AP 100 is the TXOP holder and the STA 110 is the TXOP responder. At $t_2$, the AP 100 transmits the first PPDU 200a to the STA 110. At $t_3$, the STA 110 transmits a second PPDU 200b to the AP 100. As was described earlier, the STA 110 sets the duration of the second PPDU 200b, such that the first and second PPDUs 200a, 200b finish transmission at the same time.

At $t_5$, the AP 100 and the STA 110 exchange BAs 310 after completing the respective transmission of the first and second PPDUs 200a, 200b. The STA 110 sets an RDG/More PPDU subfield in the BA 310 sent from the first STA 110 equal to 1, thereby indicating that a third PPDU 200c will follow a short inter-frame space SIFS) or reduced inter-frame space (RIFS) after transmission of the BA 310. In this situation, the STA 110 becomes the TXOP holder and the AP 100 becomes the TXOP responder.

At $t_6$, the STA 110 transmits the third PPDU 200c to the AP 100. Once the AP 100 detects transmission of the third PPDU 200c, the AP 100 can begin transmitting the fourth PPDU 200d. The AP 100 can decode the PHY header 210 of the third PPDU 200c to determine the duration thereof. Based on the duration of the third PPDU 200c, the AP 100 determines a duration of the fourth PPDU 200d and transmits the fourth PPDU 200d of the determined duration to the STA 110, as shown at $t_7$. If necessary, the AP 100 can add padding 250 to the fourth PPDU 200d or truncate the fourth PPDU 200d to ensure that transmission of the third PPDU 200c and the fourth PPDU 200d end at the same time (at $t_8$).

At t₉, the AP 100 and the STA 110 exchange BAs 310. At t₁₀, the STA 110 can transmit a CF-END 312 to the AP 100. At t₁₁, the AP 100 can transmit a CF-END 312 to the STA 110. In this case, there must be enough time remaining in the TXOP to transmit two CF-ENDs 312, which reset the NAV 116 in all neighboring STAs 110.

FIG. 3E illustrates another example of a full-duplex communication method 300e. The method 300e of FIG. 3E can be implemented to handle errors during a TXOP. In the illustrated example, the AP 100 establishes a TXOP with a STA 110 by transmitting a RTS 302 at t₀ and receiving a response CTS 304 at t₁. At t₂, the AP 100 begins transmitting a first PPDU 200a to the STA 110. At t₃, the STA 110 begins transmitting a second PPM 200b. As previously discussed, the duration of the second PPDU 200b is selected such that transmission of the first and second PPDUs 200a, 200b ends at the same time.

In this example, the AP 100 is unable to successfully decode the second PPDU 200b. For instance, the AP 100 may not have received the second PPDU 200b or the second PPDU 200b may have been corrupted during transmission. Thus, in this situation, the AP 100 does not transmit a BA 310 at t₅. The STA 110 does, however, transmit a BA 310 at t₅ because the STA 110 successfully decoded the first PPDU 200b.

At t₆, the AP 100 begins transmitting a third PPDU 200c. In this scenario, the AP 100 expects the STA 110 to retransmit the second PPDU 200b and knows the duration of the second PPDU 200b from the previous transmission. Thus, the AP 100 ensures that transmission of the third PPDU 200c will end at the same time as transmission of the second PPDU 200b. Thus, if necessary, the AP 100 can insert padding 250 to the third PPDU 200c to ensure that it is of sufficient duration. At t₇, the STA 110 retransmits the second PPDU 200b. At t₉ and t₁₀, the AP 100 and the STA 110 exchange BAs 310, thereby ending the TXOP.

In the case where the STA 110 does not successfully decode the first PPDU 200a, the STA 110 does not transmit a BA 310 at t₅. When this occurs and the AP 100 is the TXOP holder, the AP 100 can perform error recovery based on existing 801.11 error recovery mechanisms, such as retransmitting the first PPDU 200a after a PCF inter-frame space (PIFS) time.

Figure 3F:
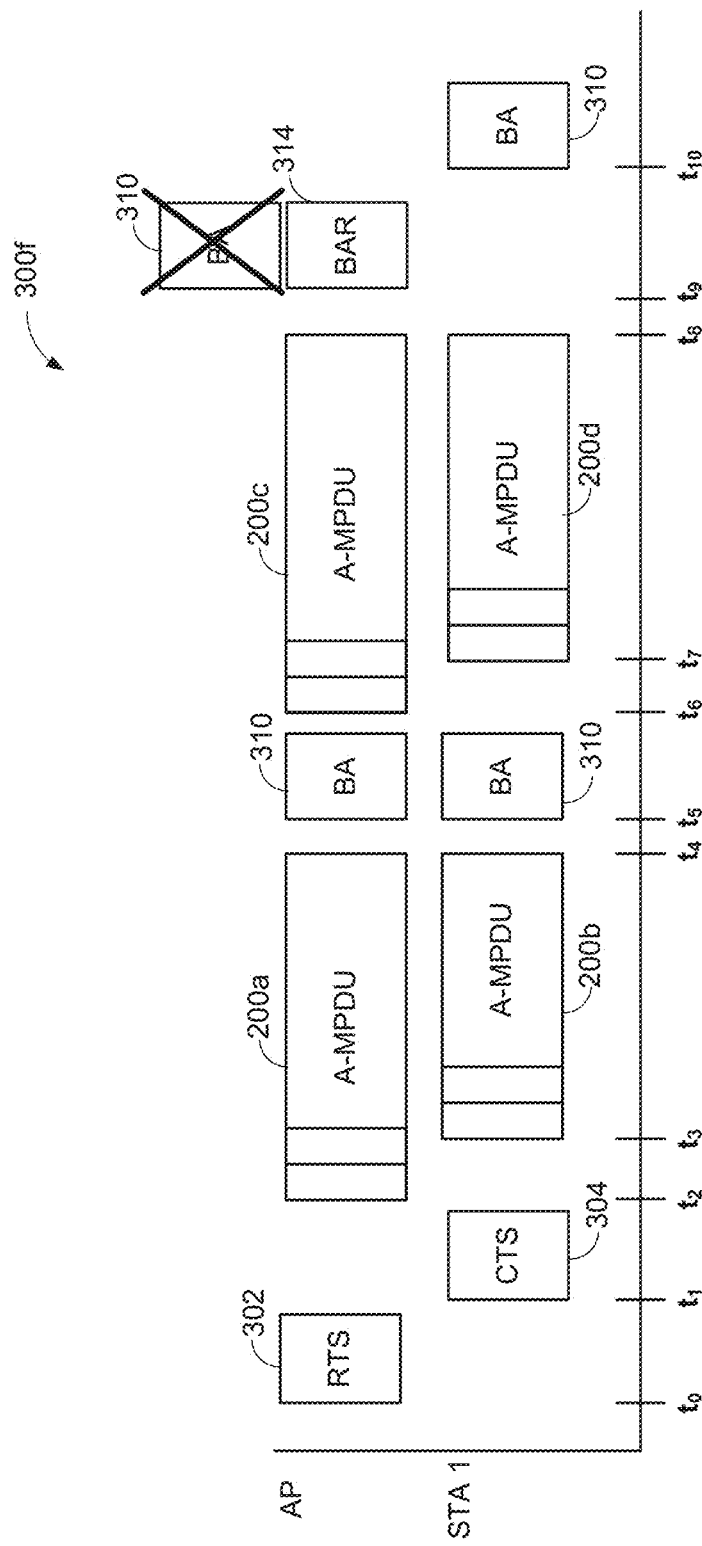

FIG. 3F illustrates another example of a full-duplex communication method 300f. The method 300f of FIG. 3F can be implemented to handle errors during a TXOP where the AP 100 is the TXOP holder and the STA 110 is the TXOP responder. In this example, the AP 100 and the STA 110 successfully exchange the first and second PPDUs 200a, 200b, but the AP 100 is unable to successfully decode the third PPDU 200c. At t₆, the AP 100 set the sequential BA subfield 238 to 1 but cannot respond with a BA 310 frame to STA-1 at t₉ because it was unable to decode the third PPDU 200c. In this case, the AP 110 transmits a BAR 314 at t₉ instead of the BA 310 to solicit the response from the STA 110. The STA 110 responds with a BA 310 frame at t₁₀.

Figure 3G:
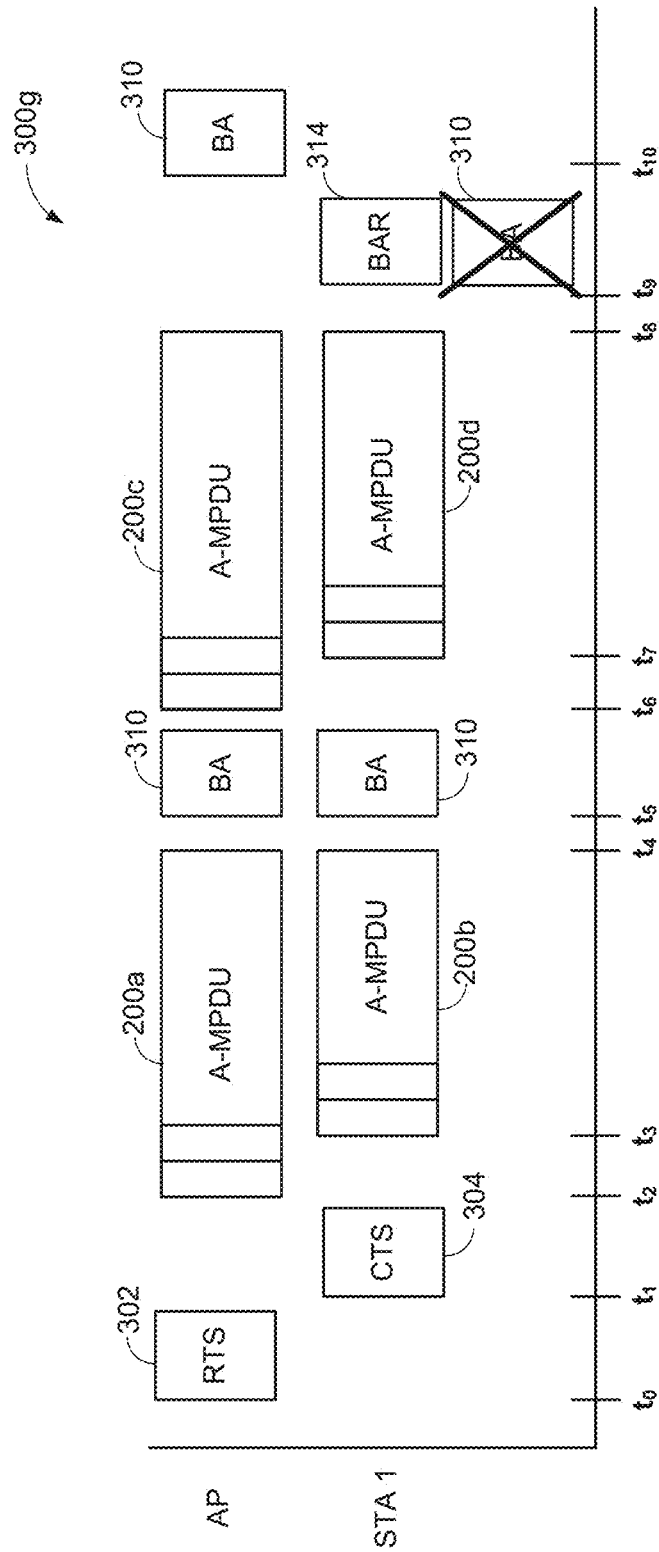

FIG. 3G illustrates another example of a full-duplex communication method 300g. The method 300g of FIG. 3G can be implemented to handle errors during a TXOP where the AP 100 is the TXOP holder and the STA 110 is the TXOP responder. In this example, the STA 110 sets the sequential BA field(s) 238 of the fourth PPDU 200d to 1, thereby indicating that the STA 110 will transmit a BA 310 when it successfully decodes the third PPDU 200c. In this example, however, the STA 110 is unable to successfully decode the third PPDU 200c. Thus, the STA 110 transmits a BAR 314 to solicit a BA 310 response from the AP 100. Upon receiving the BAR 314, the AP 110 transmits a BA 310 at t₁₀.

Figure 4A:
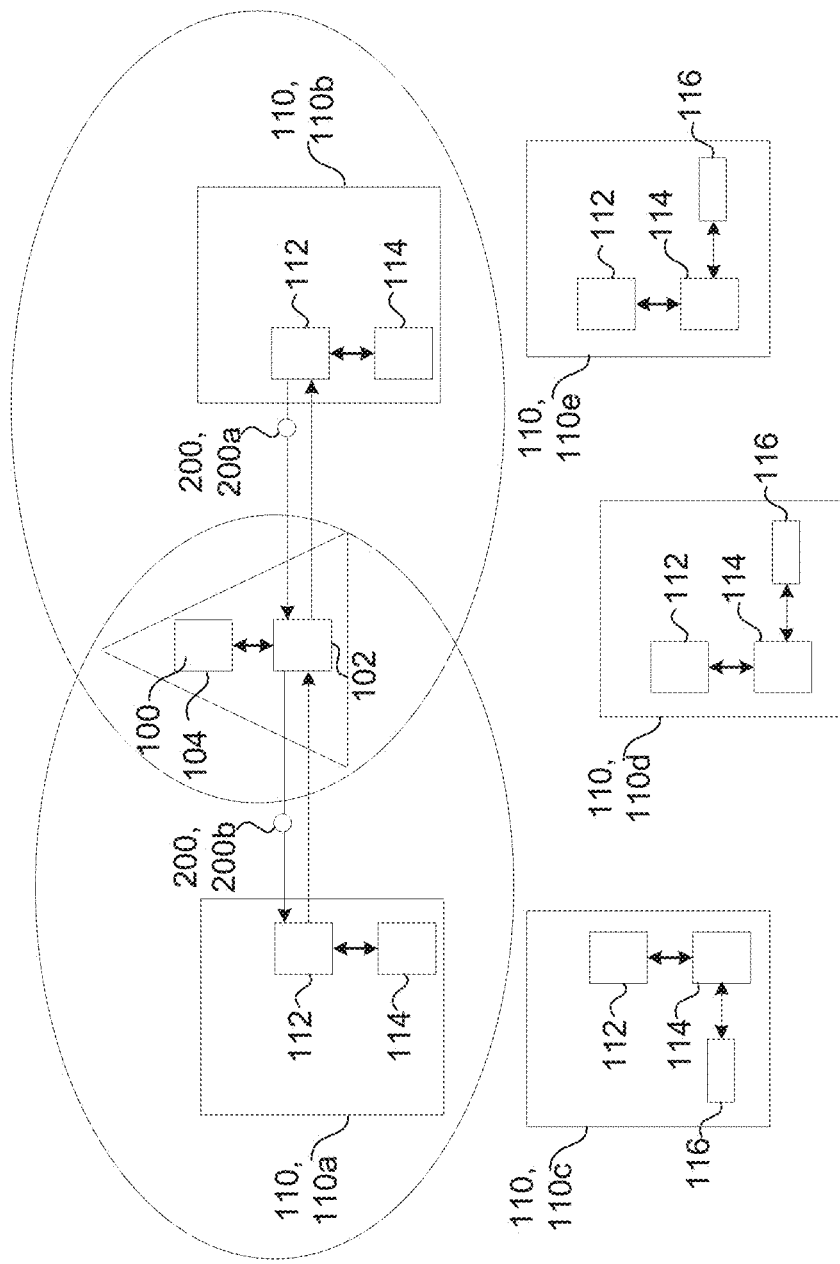
FIG. 4A is a schematic view of an example a basic service set including an access point and two or more enrollee stations configured to perform full-duplex communication.
Figure 4B:
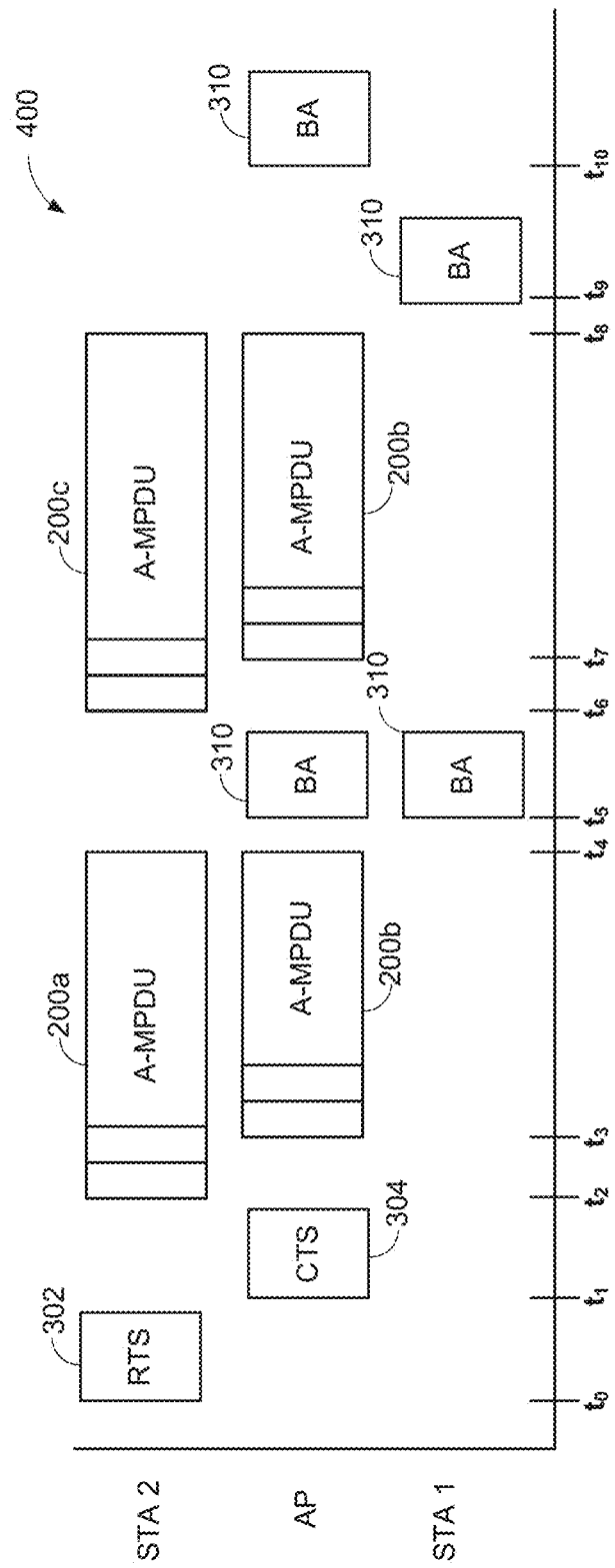
FIG. 4B is a diagram of an example method for performing full-duplex communication.

Referring now to FIGS. 4A and 4B, FIG. 4A illustrates a situation where a first STA 110a and a second STA 110b are in the same BSS but do not interfere with one another. In such a scenario, the AP 100 can receive from the second STA 110b and transmit to the first STA 110a simultaneously, or vice-versa.

FIG. 4B illustrates an example of a full-duplex communication method 400. In this example, the second STA 110b transmits to the AP 100 and the AP 100 transmits to the first STA 110a. At t₀, the second STA 110b transmits a RTS 302 to the AP 100. At t₁, the AP 100 transmits a CTS 304 to the second STA 110b. In this way, the second STA 110b has established a TXOP and is the TXOP holder. The AP 100 is the TXOP responder.

At t₂, the second STA 110b transmits a first PPDU 200a to the AP 100. Upon receiving the first PPDU 200a, the AP 100 decodes the PHY header 210 of the first PPDU 200a and determines a duration thereof. The AP 100 can determine a duration of a second PPDU 200a based on the duration of the not yet received portion of the first PPDU 200a. At t₃, the AP 100 begins to transmit the second PPDU 200b to the first STA 110a. At t₄, the second STA 110b and the AP 100 complete transmission of the first and second PPDUs 200a, 200b, respectively. At t₅, the first STA 110a transmits a BA 310 to the AP 100 and the AP 100 transmits a BA 310 to the second STA 110b. The simultaneous transmission of the BAs 310 confirms successful receipt of the respective PPDUs 200a, 200b.

At t₆, the second STA 110b transmits a third PPDU 200c to the AP 100. The second STA 110b can set the sequential BA field(s) 238 of the MAC header(s) 232 to 1. The AP 100 decodes the PHY header 210 of the third PPDU 200c and determines a duration thereof. Further, the setting of the sequential BA field 238 to 1 in the MAC header(s) to 1 instructs the AP 100 to wait for a BA 310 from the first STA 110a prior to transmitting a BA 310 to the second STA 110b. At t₇, the AP 100 begins to generate and transmit a fourth PPDU 200d to the first STA 110a. If necessary, the AP 100 can add padding 250 to the fourth PPDU 200d to ensure that the third and fourth PPDUs 200c, 200d complete transmission at the same time. At t₈, the second STA 110b and the AP 100 complete transmission of the third and fourth PPDUs 200c, 200d, respectively. At t₉, the first STA 110a transmits a BA 310 to the AP 100. Because the fourth PPDU 200d 310 after receiving the last portion of the fourth PPDU 200d. At t₁₀, the AP 100 transmits a BA 310 to the second STA 110b only after receiving the BA 310 from the first STA 110a. The sequential transmission of the BAs 310 confirms successful receipt of the respective PPDUs 200c, 200d and notifies other STAs 110 in the BSS 10 that the TXOP is complete.

The methods of FIGS. 3A-3G and 4B are provided for example and not intended to limit the scope of the disclosure. Variations of the methods may be implemented without departing from the scope of the disclosure.

Figure 5:
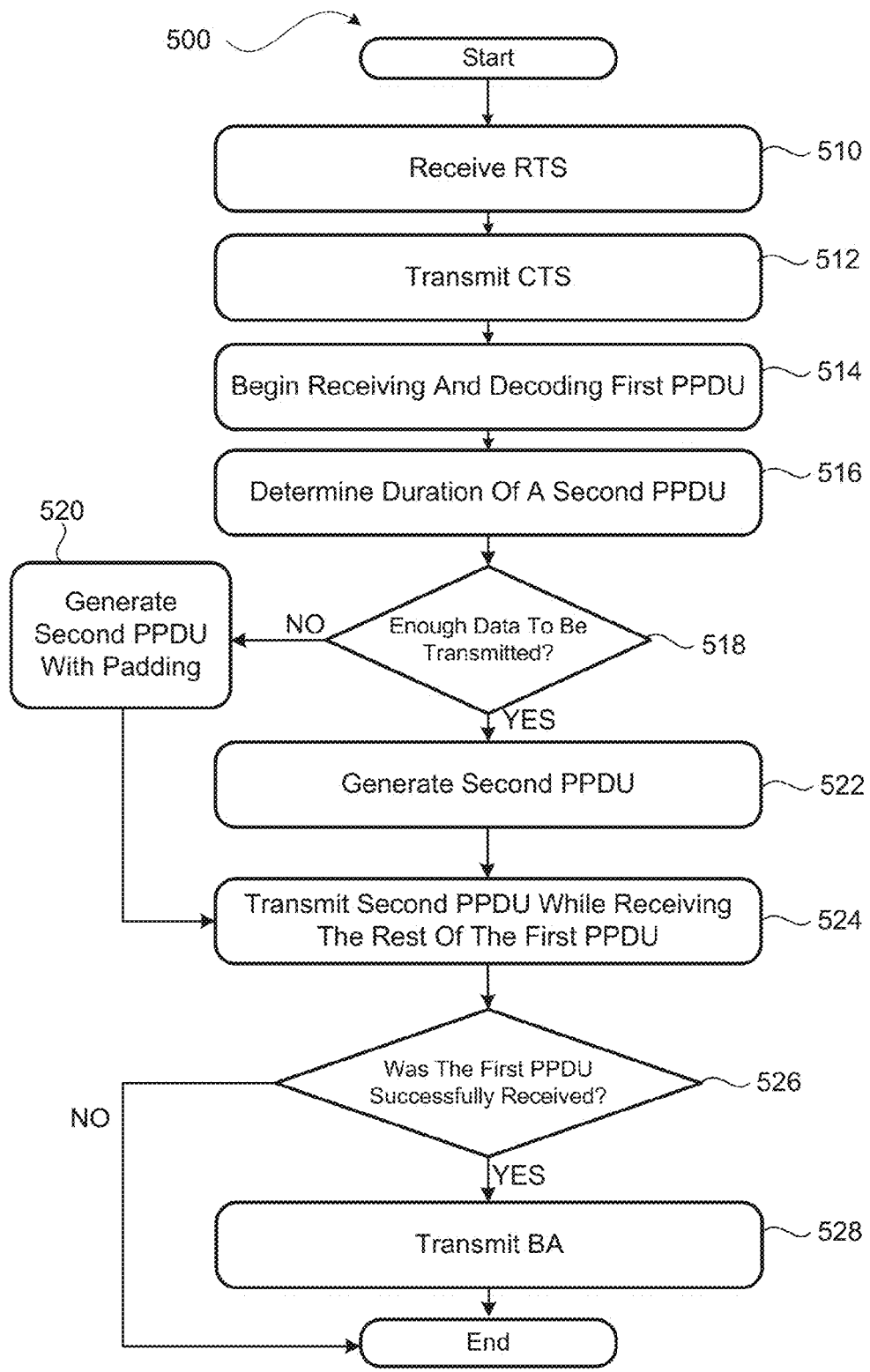
FIG. 5 is a flow chart illustrating an example set of operations of a method for performing full-duplex communication by a transmit opportunity responder.

Referring now to FIG. 5, an example method 500 for performing full-duplex communication by a TXOP responder is shown. The method 500 may be executed by the control circuitry 114 of a STA 110 or the control circuitry 104 of an AP 100.

At operation 510, the TXOP holder (e.g., the AP 100) transmits a RTS 302 to the TXOP respondent. At operation 512, the TXOP responder responds to the TXOP holder with a CTS 304. At this juncture a TXOP is established between the TXOP holder and the TXOP responder.

At operation 514, the TXOP responder begins receiving a first PPDU 200a. The PHY header 210 of the first PPDU 200a can include a duration value in the duration field 216 indicating a duration of the first PPDU 200a. Thus, as the TXOP responder receives and decodes the PHY header 210 of the first PPDU 200a, the TXOP responder can determine the duration of the first PPDU 200a. The MAC header(s) 230 of the first PPDU 200a can include sequential BA field(s) 238 indicating whether the TXOP responder is to transmit a BA 310 sequentially or simultaneously. Thus, as the TXOP responder receives and decodes the first PPDU 200a. The TXOP responder can determine whether to send sequential or simultaneous BAs 310.

At operation 516, the TXOP responder determines a duration of the second PPDU 200b based on the duration of the first PPDU 200a. The TXOP responder can determine the duration of the second PPDU 200b by determining a duration of the received portion of the first PPDU 200a and the total duration of the first PPDU 200a. Based on these values, the TXOP responder can determine a remaining duration of the first PPDU 200a. The TXOP responder can set the duration of the second PPDU 200b equal to the remaining duration of the first PPDU 200a.

At decision box 518, the TXOP responder determines whether there is enough data to be transmitted to the TXOP holder to satisfy the duration requirement for the second PPDU 200b. If there is not enough data to satisfy the duration requirement, the TXOP responder generates the second PPDU 200b and adds a sufficient amount of padding 250 to the A-MPDU 220 of the second PPDU 200b, as shown at operation 520. As previously mentioned, the padding 250 can be MAC padding and/or PHY padding. If there is enough data to be transmitted to satisfy the duration requirement, the TXOP responder generates the second PPDU 200b without padding 250. At operation 524, the TXOP responder transmits the second PPDU 200b while receiving the rest of the first PPDU 200a.

After transmission of the second PPDU 200b is complete, the TXOP responder determines whether it successfully received and decoded the first PPDU 200a, as shown at decision box 526. The TXOP responder can make this determination in any suitable manner. For example, the TXOP responder can check the FCS field 236 at the end of each MPDU 230 to determine whether it successfully decoded the MPDU 230. If the TXOP does not successfully decode any of the MPDUs 230 in the first PPDU 220a, it determines that it did not successfully decode the first PPDU 200a. If the TXOP responder does not successfully decode at least one MPDU 230 of the first PPDU 200a, the TXOP responder will not transmit a BA 310. If the TXOP responder does successfully decode the first PPDU 200a, the TXOP responder transmits a BA 310, as shown at 528. The timing of when the TXOP responder transmits the BA 310 depends on the BA sequential field 238 of the first PPDU 200a. If the BA sequential field 238 is set to 1, then the TXOP responder waits for a BA 310 before sending a BA 310. Otherwise, the TXOP responder sends the BA 310 after waiting for a predetermined amount of time (e.g., an SIFS).

The method 500 of FIG. 5 is provided for example only. Variations of the method 500 are contemplated and are within the scope of the disclosure.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a (processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e,g., HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
receiving, by control circuitry, a received portion of a first data unit, including a first header and a first aggregated medium access control protocol data unit, from a remote device;
determining, by the control circuitry, a first duration of the first data unit based on the received portion;
generating, by the control circuitry, a second data unit, including a second header and a second aggregated medium access control protocol data unit, with data to be transmitted, the second data unit having a second duration equal to a remaining duration of an unreceived portion of the first data unit;
transmitting, by the control circuitry, the second data unit to the remote device while receiving the unreceived portion of the first data unit;
decoding, by the control circuitry, a portion of the first aggregated medium access control protocol data unit to determine whether to transmit sequential block acknowledgments;
decoding, by the control circuitry, the rest of the first data unit;

when the first data unit is successfully decoded and the first header instructs the control circuitry to transmit sequential block acknowledgments;

receiving, by the control circuitry, a first block acknowledgment or a block acknowledgement request from the remote device; and transmitting, by the control circuitry, a block acknowledgement to the remote device in response to receiving the first block acknowledgment or the block acknowledgement request; and when the first data unit is successfully decoded and the first header instructs the control circuitry to transmit simultaneous block acknowledgements;

transmitting, by the control circuitry, the second block acknowledgment to the remote device without waiting to receive the first block acknowledgement, wherein the second duration is determined by the first duration subtracted from symbols divided by baud rate added to a PHY delay.

2. The method of claim 1, wherein transmitting the second data unit is completed at the same time that the remote device completes transmission of the first data unit.

3. The method of claim 1, wherein the first data unit is a first PHY protocol data and the second data unit is a second PHY protocol data unit.

4. The method of claim 3, wherein determining the first duration includes decoding, by the control circuitry, at least a portion of the first header, the first header indicating the first duration.

5. The method of claim 1, wherein generating the second data unit includes:

determining, by the control circuitry, the remaining duration based on the first duration and a received duration indicative of an amount of data received in the received portion; and determining, by the control circuitry, the second duration based on the remaining duration;

when an amount of the data to be transmitted is insufficient to satisfy the second duration:

generating, by the control circuitry, the second data unit using the data to be transmitted; and adding, by the control circuitry, a padding to the second data unit, wherein an amount of padding added to the second data unit and the amount of data to be transmitted are collectively sufficient to satisfy the second duration requirement; and when an amount of the data to be transmitted is sufficient to satisfy the second duration:

generating, by the control circuitry, the second data unit using the data to be transmitted.

6. The method of claim 1, further comprising:

receiving, by the control circuitry, a request to send from the remote device; and transmitting, by the control circuitry, a clear to send to the remote device in response to the request to send.

7. The method of claim 6, wherein transmitting the clear to send establishes a transmit opportunity.

8. The method of claim 6, wherein transmitting the clear to send sets respective network availability vectors of other devices in a basic service set of a device of the control circuitry.

9. The method of claim 1, wherein the control circuitry is a component of an enrollee station and the remote device is an access point.

10. An apparatus comprising:
a transceiver; and
control circuitry in communication with the transceiver, the control circuitry being configured to;

receive a received portion of a first data unit, including a first header and a first aggregated medium access control protocol data unit, from a remote device;

determine a first duration of the first data unit based on the received portion;

generate a second data unit, includes a second header and a second aggregated medium access control protocol data unit, with data to be transmitted, the second data unit having a second duration equal to a remaining duration of an unreceived portion of the first data unit; and transmit the second data unit to the remote device while receiving the unreceived portion of the first data unit;

decode a portion of the first aggregated medium access control protocol data unit to determine whether to transmit sequential block acknowledgments; decode the rest of the first PHY protocol data unit;

when the first PHY protocol data unit is successfully decoded and the first header instructs the control circuitry to transmit sequential block acknowledgments;

receive a first block acknowledgment or a block acknowledgement request from the remote device; and transmit a block acknowledgement to the remote device in response to receiving the first block acknowledgment or the block acknowledgement request; and when the first PHY protocol data unit is successfully decoded and the first header instructs the control circuitry to transmit simultaneous block acknowledgements;

transmit the second block acknowledgment to the remote device without waiting to receive the first block acknowledgement, wherein the second duration is determined by the first duration subtracted from symbols divided by baud rate added to a PHY delay.

11. The apparatus of claim 10, wherein the control circuit completes transmitting the second data unit at the same time that the remote device completes transmission of the first data unit.

12. The apparatus of claim 10, wherein the first data unit is a first PHY protocol data unit and the second data unit is a second PHY protocol data.

13. The apparatus of claim 12, wherein the control circuitry is configured to determine the first duration by decoding at least a portion of the first header, the first header indicating the first duration.

14. The apparatus of claim 10, wherein the control circuitry generates the second data unit by:

determining the remaining duration based on the first duration and a received duration indicative of an amount of data received in the received portion; and determining the second duration based on the remaining duration;

when an amount of the data to be transmitted is insufficient to satisfy the second duration:

generating the second data unit using the data to be transmitted; and adding a padding to the second data unit, wherein an amount of padding added to the second data unit and the amount of data to be transmitted are collectively sufficient to satisfy the second duration requirement; and when an amount of the data to be transmitted is sufficient to satisfy the second duration:

generating the second data unit using the data to be transmitted.

15. The apparatus of claim 10, wherein the control circuitry is further configured to:
  receive a request to send from the remote device; and
  transmit clear to send to the remote device in response to the request to send.

16. The apparatus of claim 15, wherein transmitting the clear to send establishes a transmit opportunity and the apparatus is the transmit opportunity responder.

17. The apparatus of claim 15, wherein transmitting the clear to send sets respective network availability vectors of other devices in a basic service set of a device of the control circuitry.

18. The apparatus of claim 10, wherein the remote device is an access point.

* * * * *